United States Patent

[11] 3,607,514

[72] Inventors Milton K. Solomon
198 Beach 133rd St.;
Norman Weill, 132-17 Boulevard, both of
Belle Harbor, N.Y.
[21] Appl. No. 680,785
[22] Filed Nov. 6, 1967
[45] Patented Sept. 21, 1971
Continuation-in-part of application Ser. No.
366,054, May 8, 1965, now Patent No.
3,368,932, dated Feb. 13, 1968.

[54] METHOD OF PRODUCING A FLOCKED NONWOVEN LAMINATE STRUCTURE
2 Claims, 2 Drawing Figs.

[52] U.S. Cl. .................................................. 156/182,
156/82, 156/297, 156/497
[51] Int. Cl. ...................................................... B32b 31/00
[50] Field of Search ............................................ 156/82,
182, 176, 178, 297, 78, 497

[56] References Cited
UNITED STATES PATENTS
3,210,227  10/1965  Shichman ...................... 156/82
3,239,399  3/1966   King ............................. 156/82
3,328,225  6/1967   Urbanic et al. ................ 156/78 X
3,360,412  12/1967  James ............................ 156/82 X
3,368,932  2/1968   Weill et al. .................... 156/82 X
3,454,449  7/1969   King ............................. 156/82 X Primary Examiner—Carl D. Quarforth
Assistant Examiner—Harvey E. Behrend
Attorney—Polachek & Saulsbury ABSTRACT: A method of forming a flocked nonwoven fabric laminate structure having a plurality of layers by a single continuous operation. The method consists of heating a sheet or web of foamed polyurethane plastic material on one surface thereof, for a time sufficient to fuse a layer thereto, pressing a sheet of nylon tricot material to the tacky surface, simultaneously heating a second sheet or web of foamed polyurethane plastic material on one surface thereof for a time sufficient to fuse a layer thereto, pressing a second sheet of nylon net material to the tacky surface of the second sheet, then pressing the tacky nylon webs together to secure them together, and spraying the outer surface of one sheet of foamed polyurethane plastic material with flock substance.

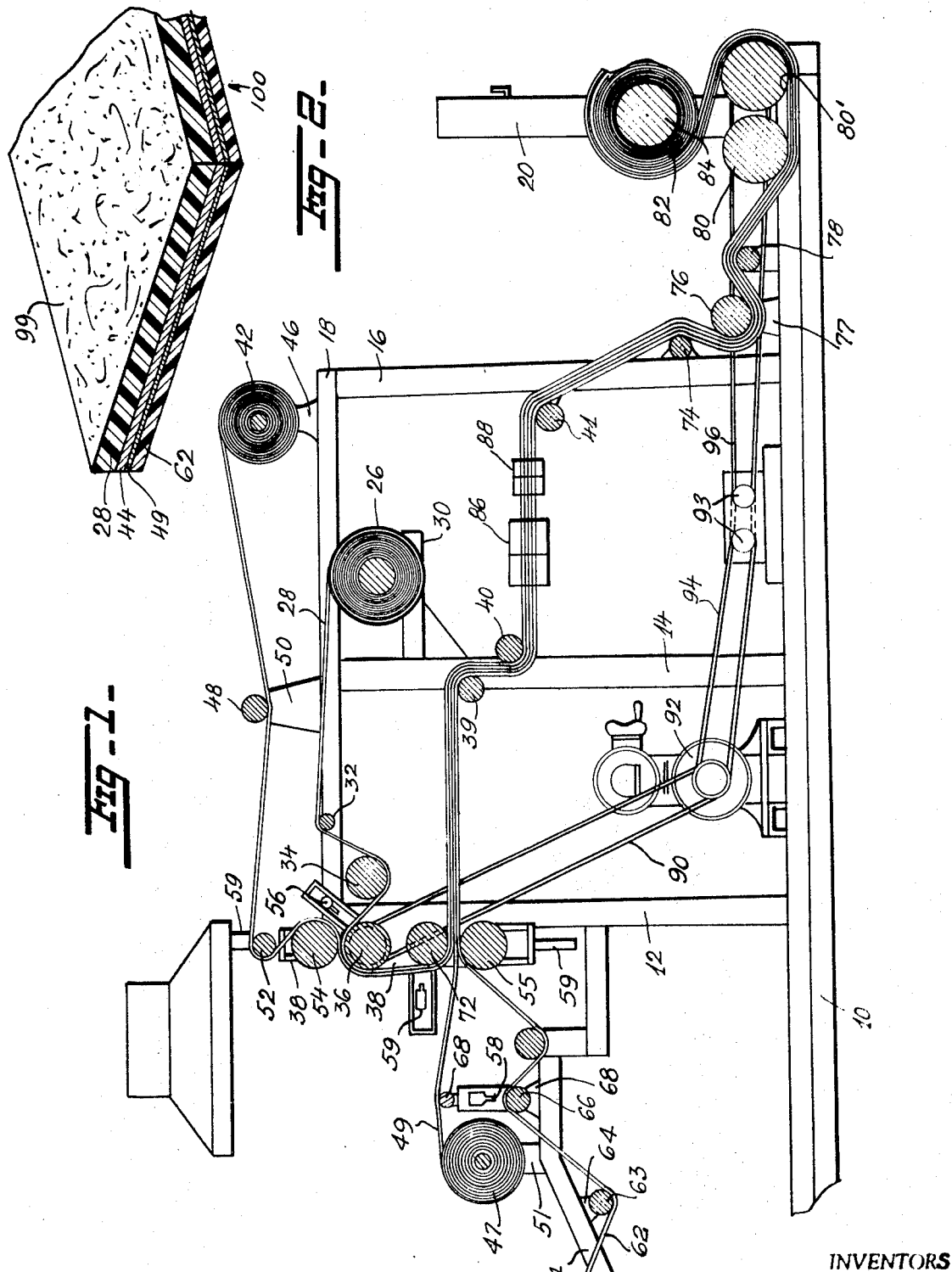

METHOD OF PRODUCING A FLOCKED NONWOVEN LAMINATE STRUCTURE

This application is a continuation-in-part of our copending U.S. Pat. application No. 366,054, filed May 8, 1965, now U.S. Pat. No. 3,368,932, issued Feb. 13, 1968.

This invention related to a composite laminated structure and more particularly to a method of producing or forming a flocked nonwoven laminate structure having a plurality of layers or substrates by a single operation.

Broadly the invention comprehends forming a laminated structure having layers or substrates of polyurethane plastic foam material of the polyester, or polyether, sometimes called plastic foam or foam plastic material and other layers of nylon fabric material. According to the invention, we propose to bind layers of nylon fabric and nylon net materials with top and bottom layers of polyurethane foam plastic material, and spraying flocking material on the top surface of the top layer of polyurethane foam material.

A principal object of the present invention is to provide an improved laminated structure of the several layers of which are formed of nylon fabrics and polyurethane foam of the polyester or polyether type, and the method of forming same according to which heat is applied to the plastic foam layers and to cause the fabric layers to adhere to each other.

A further object is to provide a simple and efficient method subject to continuous operation for forming a laminated structure in the described manner.

A specific object of the invention is to provide a method of forming a flocked nonwoven laminated structure of a plurality of layers by a single operation.

FIG. 1 is a diagrammatic illustration of apparatus for carrying out the method of the invention.

FIG. 2 is a perspective view showing a portion of the laminated structure formed in accordance with the invention.

Referring now in detail to the drawings, in FIG. 1 there is shown apparatus for carrying out the process or method of the invention, to form a laminated structure comprising layers of polyurethane foamed plastic material of the polyester type with layers of nylon fabric material interposed between the foam layers, and with flock material adhering to the outside of one foam layer. The apparatus includes a frame having a base 10, spaced upright posts, 12, 14, 16, supporting a top beam 18. Another upright post 20 is positioned at one end of the base and is shorter than the upright posts 12, 14 and 16. An angular bracket 24 extends laterally of the upright post 12 adjacent the top thereof.

A supply roll 26 of sheet polyurethane foam plastic material of the polyester or polyether type, sometimes called plastic foam or foamed plastic material, preferably of a thickness of 0.050 inches is supported on a bracket 30 fixed on upright post 14 at the top thereof. Material from roll 26 is drawn over an idler 32 on top beam 18 and downwardly under and around an expander roller 34 for taking the wrinkles out of the web, and thence over and around a water-cooled roller 36 slidably supported in a vertical frame 38 mounted on upright post 12, at the top thereof, the material passing from right to left, as viewed in FIG. 1. When the material passes around roller 34, the outer surface of the material is heated by a burner 56. As the formed material 28 passes the burner 56, the surface of the material is caused to assume a soft and tacky condition. Only a superficial heating rendering the surface soft and tacky without altering the structure of the remainder of the material is desire.

A supply roll 42 of sheet a sheet of about forty denier nylon tricot material 44 is supported on an upright post 46 on the top of the beam 18, at one end thereof. Material from roll 42 is drawn under an idler 48 supported on an upright post 50 on the beam 18 and then passes over a spiral roller 52 above the other end of the top beam 18. From the idler 52, the material passes downwardly around a water-cooled roller 54 slidably supported on the vertical frame 38.

Another supply roll 47 of a sheet of fifteen denier nylon net material 49 is supported on a bracket 51 fixed to bracket 24. Material from roll 47 is drawn over an idler 68 and thence around and over a water-cooled roller 55 slidably supported in the frame 38. From roller 36, the material comprising layers 28 and 44 passes downwardly, past burner 59 and around roller 72 over the material 49. When the layers 28, 44 pass over roller 36, a blast of air is forced downwardly through air cylinder 59 against roller 54 presses roller 54 against roller 36 thereby joining the material 44 to material 28. The air comes from any suitable supply.

A under supply roll 60 of polyurethane foam material 62 is supported on the outer end of bracket 24 fixed on post 12. Material from roll 60 is drawn under an idler 63 supported on a bracket 64 depending from bracket 24 thence over an idler 66 on a bracket 68 on bracket 24 and thence under a roller 70 on bracket 24 and thence over roller 55 slidably supported on frame 38 underneath roller 72, the material 62 passing from left to right as viewed in FIG. 1. When the material passes around roller 66, the outer surface thereof is heated by a burner 58 and softened. When the material 62 passes over roller 55, a blast of air from air cylinder 69 against roller 55 presses roller 55 against roller 72 thereby joining the foam material 62 to the nylon fabric 49. At the same time fabric 44 which has been heated by burner 44 causes a flow of softened foam material from both layers 28 and 62 through the interstices of both fabric layers 44 and 49 so that both of these layers stick together when cooled by roller 55, thereby forming a four-ply laminated structure as shown in FIG. 2. The air for cylinder 69 comes from any suitable source.

After the nylon materials 44 and 49 have been rolled against the foamed materials 28 and 62 causing the nylon fabric materials to adhere to the foamed materials and causing the nylon fabric layers to stick to each other, the resulting laminated structure is transported via rollers 39, 40 to and through conventional flocking mechanism 86. The flocking mechanism includes means for applying a soft adhesive to the top surface of the foam layer 28 and then passing the material with the adhesive thereon to and through a casing having a chamber with a spraying device therein where flock material is blown onto the adhesive surface. From the spraying chambers and device, the laminated structure passes through a heated drying device or dryer 88 at 400° F. until the adhesive and flock are completely dried and cured. From the dryer, the laminated structure is moved over guide rollers 41 and 74 on post 16 and thence under an expander roller 76 supported by bracket 77 on the base 10, over an idler 78 on the base and thence to and over a pair of rewind rollers 80, 81' and finally to the finished roll 82 of four-ply flocked laminates structure supported on roller 84 on post 20.

In operation, the sheets 28, 44, 49 and 62 are driven through the apparatus by means of the roller 36 which is turned by a chain 90 driven by an engine 92 on the base 10. Chains 94 and 96, operatively connected to the engine via coupled sprockets 92, drive the rewind rollers 80, 80'. The operation is continuous at the rate of 60 yards per minute and completely automatic. The resulting laminated structure 100 with flocked top surface 99 layer 28 is shown in FIG. 2 and comprises a new improved type of fabric and foam laminated structure having a luxurious body excellent tensile strength, dry cleanable and suitable for the apparel, shoe, slipper, hat and industrial trades.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A method of forming a laminate structure, comprising the steps of: heating one side of a first sheet of foamed polyurethane plastic material to render one surface of the sheet tacky; pressing a second sheet of woven nylon fabric material onto said tacky surface to bond the two sheets together, a simultaneously heating one side of a third sheet of foamed polyurethane plastic material to render one surface thereof tacky; passing a fourth sheet of woven nylon fabric between the second and third sheets; simultaneously heating the second to render the adjacent plastic foam surface soft and tacky; and pressing the first, second, third and fourth sheets together so that foam plastic from the first and third sheets is forced through interstices in the second and fourth sheets to bond the first, second, third and fourth sheets together with the second and fourth sheets interposed between the first and third sheets.

2. A method as defined in claim 1, further comprising the steps of applying an adhesive to the other side of the first sheet, applying flock material to the adhesive on the other side of the first sheet, and drying the adhesive to cause the flock material to stick to and form a layer on the other side of the first sheet on the outside of said laminate structure.